(12) United States Patent
Brand

(10) Patent No.: US 7,006,944 B2
(45) Date of Patent: Feb. 28, 2006

(54) METHOD FOR DETERMINING POSES OF SENSORS

(75) Inventor: Matthew E. Brand, Newton, MA (US)

(73) Assignee: Mitsubishi Electric Research Labs., Inc., Cambridge, MA (US)

( * ) Notice: Subject to any disclaimer, the term of this patent is extended or adjusted under 35 U.S.C. 154(b) by 53 days.

(21) Appl. No.: 10/705,104

(22) Filed: Nov. 10, 2003

(65) Prior Publication Data

US 2005/0110679 A1 May 26, 2005

(51) Int. Cl.
*G01C 17/00* (2006.01)
*G01S 3/02* (2006.01)

(52) U.S. Cl. ............... 702/150; 702/189; 342/453

(58) Field of Classification Search ........... 702/150, 702/151, 189; 342/453, 378, 393, 394, 471, 342/445
See application file for complete search history.

(56) References Cited

U.S. PATENT DOCUMENTS 5,444,451 A * 8/1995 Johnson et al. ............. 342/453

OTHER PUBLICATIONS

Antone et al., "Scalable extrinsic calibration of omni-directional image networks," IJCV 49, pp. 143-174, 2002.
Roweis et al., "Nonlinear dimensionality reduction by locally linear embedding," Science 290, pp. 2323-2326, 2000.
Taylor, C.J., Kriegman, D.J.: Structure and motion from line segments in multiple images. In: Proc. IEEE International Conference on Robotics and Automation. (1992) 1615-1620.
Debevec, P.E., Taylor, C.J., Malik, J.: Modeling and rendering architecture from photographs: A hybrid geometry- and image-based approach. In: Proc. SIGGRAPH. (1996) 11-20.
Poelman, C.J., Kanade, T.: A paraperspective factorization method for shape and recovery. In: Proc. ECCV. (1994) 97-108.
Adam, A., Rivlin, E., Shimshoni, I.: ROR: Rejection of outliers by rotations in stereo matching. In: Proc. CVPR. (2000) 2-9.

* cited by examiner

*Primary Examiner*—Bryan Bui
*Assistant Examiner*—Meagan S Walling
(74) *Attorney, Agent, or Firm*—Dirk Brinkman; Andrew J. Curtin

(57) ABSTRACT

A method determines poses of a sensors distributed in an environment. A signal of the environment is acquired by each sensor. Features in each signal that correspond to the features in at least one other signal are identified. Directions between the sensors and the corresponding features are determined. Nullspaces of the directions are used to construct a matrix. A nullspace eigenvector is determined of the matrix, and then the nullspace eigenvector is reconfigured to a matrix specifying the locations of the sensors.

7 Claims, 6 Drawing Sheets

METHOD FOR DETERMINING POSES OF SENSORS

FIELD OF THE INVENTION

This invention relates generally to sensors, and more particularly to determining poses of the sensors.

BACKGROUND OF THE INVENTION

In many computer applications it is necessary to determine poses of sensors relative to sensed features in the environment in which the sensors are located. The pose of a sensor gives both the location and the orientation of the sensor. In three-dimensions, the location is usually specified by a three-dimensional Cartesian coordinate system (x,y,z), and the orientation is specified by a three-dimensional polar coordinate system (u,v,w).

For example, many computer vision and graphics applications require that the poses of cameras are known. These applications include three-dimensional reconstructions, modeling by structure-from-motion, photo-realistic rendering, image based environment augmentation, simulation, and image registration, to name but a few.

In a simple application, signals in the form of stereo images are acquired of a scene by a pair of cameras. Features common to both images are identified. The features are used to determine the extrinsic parameters (pose) of the cameras. In that application, the scene is localized, and the signals have a high degree of overlap. This results in a large set of common features. When two cameras take two overlapping images, it is simple to determine the relative poses of the cameras, up to scale and orientation.

The invention is concerned with determining the poses of sensors widely distributed in the environment. For example, signals in the form of images are acquired by security cameras at various locations in a city, or by a tourist wandering through the city, or by mobile telephone cameras as users move about in the city. In another application, the signals are acquired from a portion of the universe with radio telescopes that are thousands of kilometers apart. Arrays of microphones or seismographs scattered over the globe are other examples of large scale sensor networks.

Accordingly, the signals to be processed by the invention have two primary characteristics: the environment in which the signals are acquired is large; and the set signals are said to be sparse. Although some features in one signal overlap, in some part, with features in another signal, most of the signals have very little in common.

Numerous techniques are known for determining the poses of sensors from acquired signals. Of special interest are methods that decouple the three translational DOFs (locations) from the three rotational DOFs (orientation). In such methods, the degrees of freedom are typically factored to reduce the number of parameters that are estimated simultaneously. Both interactive and automated methods are known. Interactive methods do not scale effectively and are vulnerable to operator error and numerical instability. Therefore, automated methods are preferred.

Projective techniques can also be used to recover structure and pose, but only up to an arbitrary projective transformation. Other structure-from-motion methods use singular value decompositions or random searches. However, most prior art methods require a large set of corresponding features.

Antone et al. describe a method for recovering corresponding features (correspondences) from a sparse a set of images in "Scalable extrinsic calibration of omni-directional image networks," IJCV 49, pp. 143–174, 2002. The correspondences can be found by a random search, or from rough indicators of co-location, e.g., image histogram matches, edge detection, assignments to wireless communication cells, or GPS. Antone et al. also describe how to determine a global orientation of the set of partially overlapping images by analyzing the sparse correspondences.

SUMMARY OF THE INVENTION

The invention provides a method for determining poses of sensors distributed over a large scale environment, for example, a city or the world. The method takes as input sparse signals acquired by the sensors. Sparse means that only a small number of features in each signal overlap with a small number of features in at least one other signal. The method determines the pose, i.e., the location and orientation, of sensor for each signal.

The invention models this problem as an embedded graph. A partial spectral decomposition of a quadratic form is applied to the embedded graph. A minimum squared error (MSE) solution determines poses of the sensors and the features in any number of dimensions.

The spectral decomposition also identifies insufficiently constrained problems, which can then be decomposed into well-constrained rigid sub-problems. The sub-problems can then be analyzed to determine new poses for the sensors to acquire additional signals that will resolve the missing constraints.

The invention is specifically useful for a large number of sparsely distributed sensors where directional constraints are determined from corresponding features in the signals.

For camera images, the spectral decomposition yields a solution that is consistent to a fraction of a millimeter, improving over the state of the art calibration methods by four orders of magnitude. The method is also faster by at least two orders of magnitude.

In contrast with the prior art iterative process, the method according to the invention provides closed-form solutions in linear time that are numerically stable. The method is simple and fast to implement.

DETAILED DESCRIPTION OF THE PREFERRED EMBODIMENT

System Structure

Figure 1:
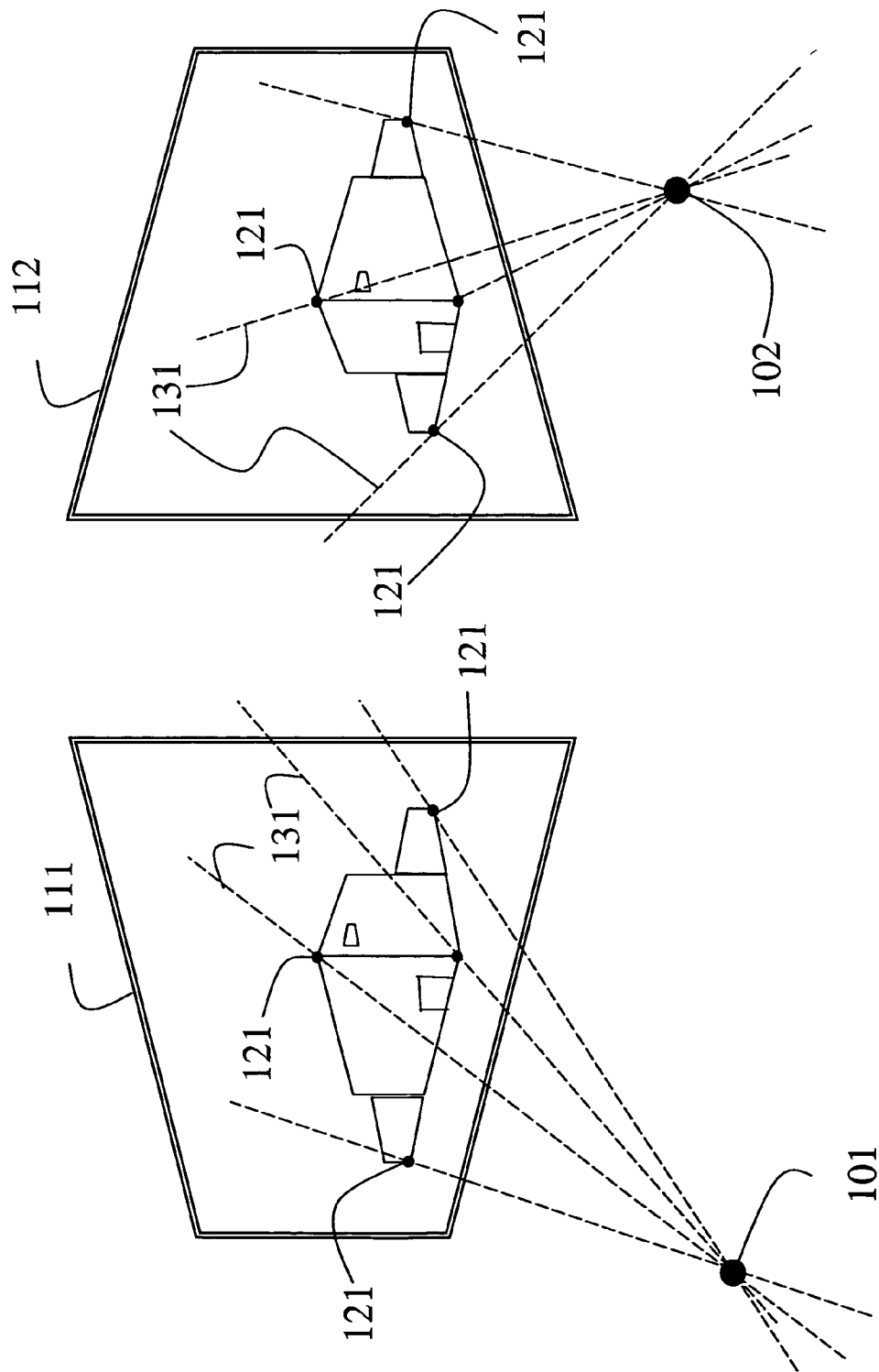
FIG. 1 is a diagram of sensors and signals to be analyzed by the method according to the invention.

FIG. 1 shows sensors or 'nodes' 101–102, e.g., cameras. A method according to my invention determines the poses of the sensors by analyzing signals 111–112, e.g., images, acquired by sensors. As a characteristic, the signals are acquired of a large environment, for example, an urban area, or a portion of the universe. Each signal has only a small number of features 121 in common with another signal. Consequently, the signals are said to be sparse.

The method according to my invention treats this problem as a graph embedding problem. Prior art solutions typically constrain a pose of a node by linear mixtures of directions to neighboring nodes, with a known mixture weights, see Roweis et al., "Nonlinear dimensionality reduction by locally linear embedding," Science 290, pp. 2323–2326, 2000.

Similarly, my method constrains node poses to be linear mixtures of directions 131 between nodes and features 121, however, with an unknown mixture weights. The directions essentially reflect orientations of the nodes. To determine the pose, the locations of the nodes also need to be determined. As a result, my method has a novel structure. In contrast to all prior art spectral embedding methods, my solution is specified by a single eigenvector, regardless of the dimensionality of the embedding. The eigenvector can be reconfigured easily into a matrix to recover the (x,y,z) locations of the sensors.

Figure 2B:
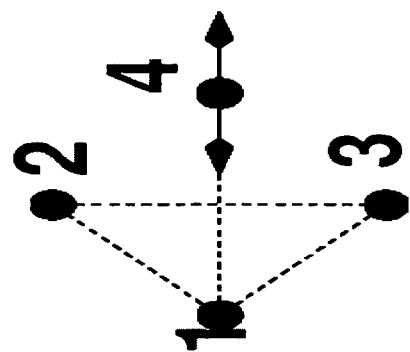
FIG. 2B is a diagram of a graph assembling the vectors of FIG. 3.
Figure 2A:
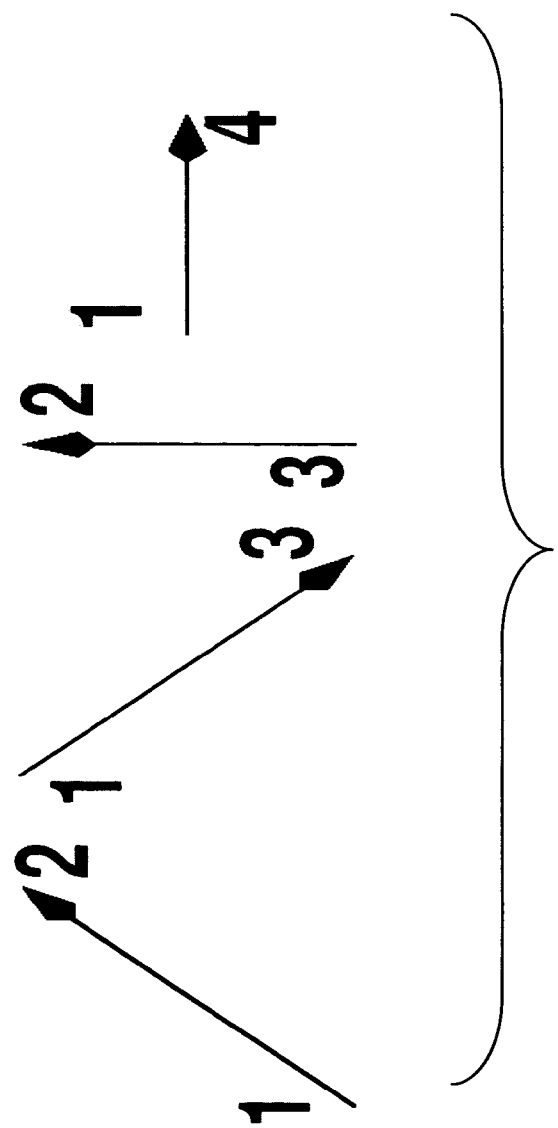
FIG. 2A is diagram of directions to be assembled into a graph.

FIG. 2A shows a simple embedding problem. A set of directional constraints 1–4 must be assembled into a graph. FIG. 2B shows a solution that can have degrees of freedom, e.g., node 4 is only partially constrained. In 2D, the problem is trivial. In higher dimensions the constraints can be, simultaneously, inconsistent and overconstrained and underconstrained.

Method of Operation

Figure 3:
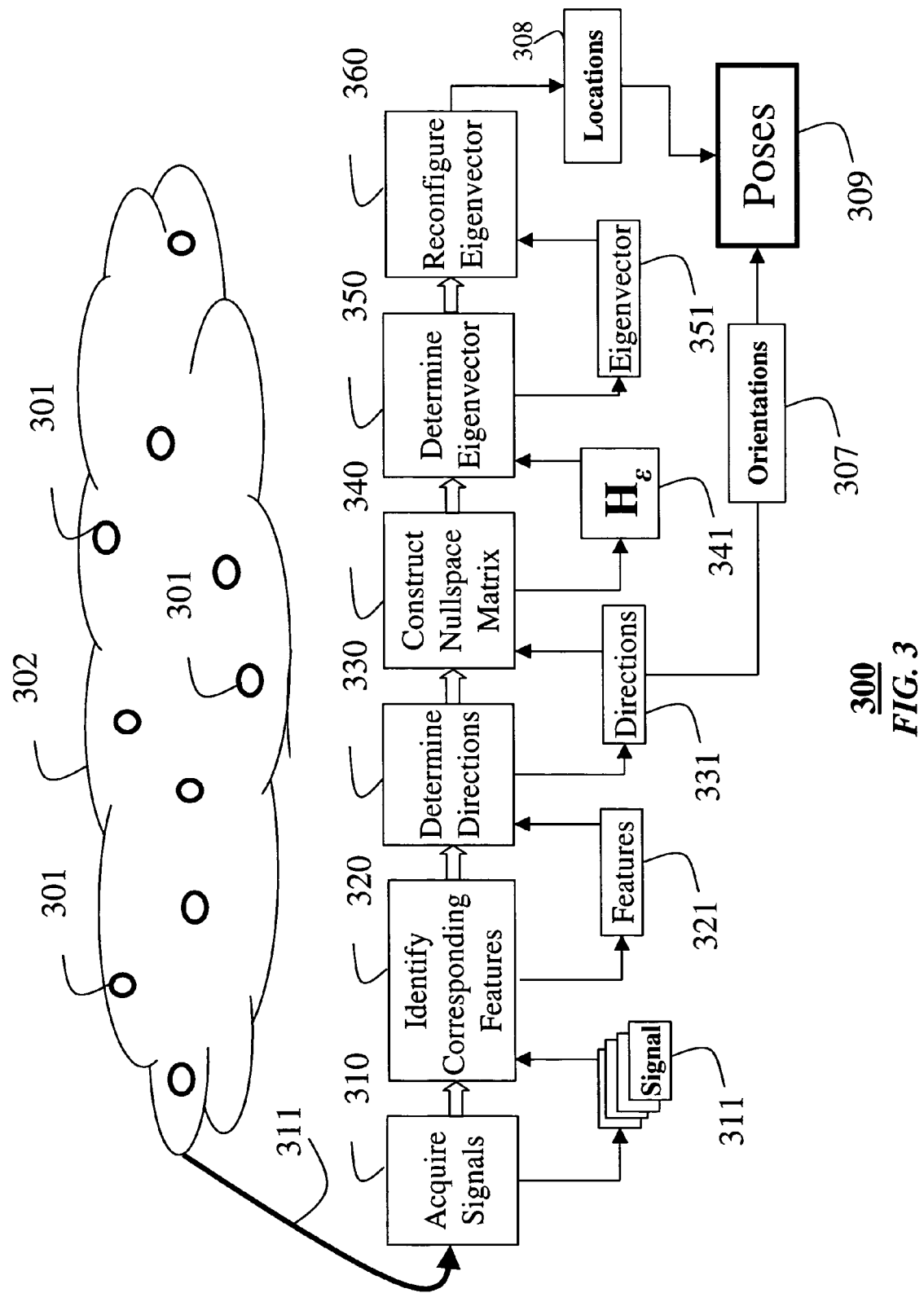
FIG. 3 is a flow diagram of a method according to the invention.

FIG. 3 shows a method 300 according to the invention. Sensors 301 are placed in a large environment 302. Signals 311 are acquired 310 by the sensors of the environment. Corresponding features 321 in the signals are identified 320. Directions 331 between the sensors and the features are determined 330. The directions reveal the orientations 307 of the nodes.

A nullspace matrix $H_\epsilon$ 341 is constructed 340 from the directions. An eigenvector 351 of the nullspace matrix is determined 350. Then, the eigenvector is reconfigured 360 into a matrix. The matrix has one row for each dimension of recovered locations 308. Then, the orientations 307 and the locations 308 reveal the poses 309 of the sensors 301.

Directionally Constrained Embeddings

Formally, the directionally constrained embedding problem is stated as follows. An input is a set of N nodes 301 and an incomplete specification of node-to-node directions $d_{ij} \in \mathcal{R}^d$ 331 between some nodes $i,j \in [1,N] \subset \mathcal{N}, i \neq j$. Signs and lengths of the true node-to-node displacements are unknown. The solution is a set of consistent embeddings in $\mathcal{R}^d$ that can be determined uniquely up to scale and translation.

My spectral solution is based on a thin eigenvalue decomposition (EVD). An embedding matrix $X \doteq [x_1, \ldots, x_N] \in \mathcal{R}^{d \times N}$ contains a location $x_i \in \mathcal{R}^d$ of the $i^{th}$ node in column i. It is desired to determine an embedding where node-to-node displacements $(x_i - x_j)$ are maximally consistent with the constraint directions $d_{ij}$ 331.

Maximum Covariance Spectral Solution

First, the squared length of the projections of the displacements onto the constraints are maximized by $$C(X) \doteq \Sigma_{ij} \|(x_i - x_j)^T d_{ij}\|^2, \quad (1)$$

where $\|X\|$ denotes the Frobenius or Euclidean norm. Clearly, C has a quadratic form. Therefore, the problem is convex. To maximize C, all embedding directional vectors $$y \doteq \text{vec} X = [x_1^T, x_2^T, \ldots x_N^T]^T$$

are vertical concatenated with a symmetric matrix $$H_C \doteq [\searrow \Sigma_j (d_{ij} d_{ij}^T + d_{ji} d_{ji}^T)] - \Downarrow_i [\Rightarrow_j (d_{ij} d_{ij}^T + d_{ji} d_{ji}^T)]] \in \mathbb{R}^{dN \times dN} \quad (2)$$

where the arrows indicate vertical, horizontal, and block-diagonal concatenation.

A maximizing eigenvector of $H_C$ determines an embedding y that maximizes C, up to sign and scale.

By construction, $$C = \sum_{ij} (x_i - x_j)^T d_{ij} d_{ij}^T (x_i - x_j)$$

$$= \sum_{ij} x_i^T (d_{ij} d_{ij}^T) x_i + x_j^T (d_{ij} d_{ij}^T) x_j - x_i^T (d_{ij} d_{ij}^T) x_j - x_j^T (d_{ij} d_{ij}^T) x_i$$

$$= y^T H y.$$

By the Schmidt-Eckart-Young theorem, a maximum of quadratic form $$(y^T H_C y)/(y^T y)$$

is a largest eigenvalue $\lambda_{max}(H_C)$, attained at the corresponding eigenvector $y = v_{max}(H_C)$, see Eckart et al., "The approximation of one matrix by another of lower rank," Psychometrika, Vol. 1, pp. 211–218, 1936.

Therefore, an optimal embedding is $X = y^{(d)} = v^{(d)}_{max}$. This is an order-d vector transpose that reconfigures the vector $y \in \mathcal{R}^{dN \times 1}$ into a matrix $X \in \mathcal{R}^{d \times N}$, where each row d corresponds to a dimension of the locations. The norm of any directional vector $\|d_{ij}\|$ determines how strongly the norm constrains a final solution. If $\|d_{ij}\| = 0$, then the constraint is removed from the problem. Thus, the problem admits sparse constraints.

Minimum Squared-Error (MSE) Spectral Solution

Maximum covariance problems favor solutions where large displacements are directionally accurate, sometimes at the expense of directionally inaccurate short displacements. A minimum squared-error framework is preferable, because the error is spread evenly over the solution and guarantees an exact solution when allowed by the constraints. To obtain the MSE solution, the components of the displacements that are orthogonal to the desired directions are minimized. An error function is $$\epsilon(X) \doteq \Sigma_{ij} (\|(x_i - x_j)^T d_{ij}^\perp\| \cdot \|d_{ij}\|)^2 \quad (3)$$

where $d_{ij}^\perp$ is an orthonormal basis of a nullspace of the direction $d_{ij}$. The nullspace is defined as all directions orthogonal to a given subspace. In this case, all directions are located on a plane perpendicular to the vector $d_{ij}$.

As shown in FIG. 1, one can visualize each directional constraint $d_{ij}$ as a line emanating from node i or j. The value $\epsilon(X)$ sums the squared distance from a node to each line on which the node is located, scaled by the length of the line. All constraints are weighted equally when all directions $d_{ij}$ have the same norm. If the constraints admit an errorless embedding, then the embedding is invariant to any non-zero rescaling of the constraints. To minimize the error function $\epsilon$, a nullspace matrix $H_\epsilon$ 341 is constructed 340 similar to the matrix $H_C$, except that with the following replacement in equation (2)

$$(d_{ij}d_{ij}^T) \Leftarrow (d_{ij}^T d_{ij}) \cdot I - d_{ij}d_{ij}^T \qquad (4)$$

A minimizing eigenvector 351 of $H_\epsilon$ in the space orthogonal to $1_{[N \times 1]} I_{[d \times d]}$ determines the desired non-degenerate embedding y that minimizes the error function (3), up to sign and scale.

As described above, $\epsilon(y) = y^T H_\epsilon y$ can be is minimized by an eigenpair $\{\epsilon(y^{(d)}) = \lambda_{min}(H_\epsilon), y = v_{min}(H_\epsilon)\}$ because $(d_{ij}^T d_{ij}) \cdot I - d_{ij}d_{ij}^T = (d_{ij}^T d_{ij}) \cdot (I - d_{ij}d_{ij}^T/(d_{ij}^T d_{ij})) = (d_{ij}^{-1}) \|d_{ij}\|^2 (d_{ij}^{-1})^T$; i.e., a scaled orthogonal projector that isolates the component of $x_i - x_j$ that is orthogonal to the direction $d_{ij}$, and scales it by $\|d_{ij}\|^2$. The 1I constraint arises because the directional constraints are trivially satisfied by mapping all nodes to a single point in $\mathcal{R}^d$. This implies that the nullspace matrix $H_\epsilon$ contains d nuisance eigenvectors that give an orthogonal basis for locating a point anywhere in $\mathcal{R}^d$. That basis is spanned by $1_{[N \times 1]} I_{[d \times d]}$, because $H_\epsilon(1I) = 0_{[Nd \times d]}$. This also gives an orthogonal basis for translating the solution in the embedding space. Therefore, the non-degenerate embedding must be in the nullspace of $H_\epsilon$ that is orthogonal to 1I.

Prior art eigensolvers may not separate the nullspace matrix $H_\epsilon$ into translational and embedding eigenvectors. In addition, prior art methods are generally prone to a numerical error separating the nullspace and near-nullspace eigenvectors.

Suppressing the translational eigenvectors can improve the numerical stability of the problem. To do so, the nullspace matrix $H_\epsilon$ is projected onto an orthogonal basis $Q \in \mathcal{R}^{Nd \times (N-1)d}$ of the nullspace of the translation basis, i.e., $Q^T Q = I$, and $Q^T(1I) = 0$. The reduced problem is then eigendecomposed, and the eigenvectors are back-projected by:

$$V'\Lambda V'^T \xleftarrow{EVD} Q^T H_\epsilon Q \qquad (5)$$

$$V \xleftarrow{} QV. \qquad (6)$$

The quadratic form of $H_\epsilon$ is sparse and the nullspace basis Q has a simple structure, suggesting that special computational efficiencies are available to reduce the cost of computing a very large EVD.

In fact, neither matrix has to be computed explicitly to obtain the desired eigenvector 351. First, equation (2) can be used to determine $y^T(I - H_\epsilon)$ directly from y and the directional constraints. Thus, a method is enabled for determining the eigenpair $\{\lambda_{max}(I - H_\epsilon), v_{max}(I - H_\epsilon)\} = \{1 - \lambda_{min}(H_\epsilon), v_{min}(H_{min}(H_\epsilon E)\}$ without constructing the matrix $H_\epsilon$ itself.

In addition, Q is a centering matrix: $Q = \text{null}((1I)^T) = \text{null}(1^T)I$. The matrix Q in equations (5–6) configures 360 the solution to be centered on the origin by ensuring that all rows of $X = y^{(d)}$ sum to zero. Equation (5–6) can be eliminated by recentering the vector y for each iteration of the configuring.

If a direction is uncertain, then the directional vector $d_{ij}$ can be replaced with a matrix $D_{ij}$ where orthogonal columns are each scaled by the certainty that the constraint lies in that direction. The outer product $\Sigma_{ij} = D_{ij} D^T_{ij}$ is effectively the covariance of a Gaussian distribution over all possible directions. The associated scaled orthogonal projector is $\|\Sigma_{ij}\|^2 \cdot I - \Sigma_{ij}$. If the columns of the matrix $D_{ij}$ are unscaled, the directional constraint is simply weakened to a subspace constraint, i.e., $x_j - x_i$ lie as closely as possible to the subspace spanned by $D_{ij}$.

Problems with Constraints

The spectral solution is MSE-optimal with respect to the constraints. In vision problems, the constraints themselves are derived from image data, and thus the constraints may be suspect. Therefore, additional processing may be needed to detect and resolve ill-posed problems where the constraint data are insufficient or inconsistent.

Underconstrained Problems

A problem is underconstrained under two possible conditions. First, a connectivity graph is disconnected, i.e., there is no undirected path from i to j, allowing two partial embeddings that can rigidly transform in each other's coordinate frame. Second, all constraints on a node are co-linear, allowing the node to slide along any one directional constraint. Both cases will manifest themselves as multiple zero or near-zero eigenvalues in the spectrum of the matrix $H_\epsilon$, i.e., rotating any two eigenvectors in this approximate nullspace animates one such undesired degree of freedom, giving an orbit of solutions.

In this way, the eigenvalue multiplicity diagnoses the dimensionality of the subspace of solutions. However, multiplicity does not correspond to excess DOFs. An orbit may be redundantly expressed in d eigenvectors, each giving a different dynamics for varying the same positional DOF. Some further analysis is need to characterize the intrinsic DOFs in the problem specification.

When a solution has many DOFs, it is useful to cluster nodes that articulate together. Intuitively, two nodes articulate together when both nodes have non-zero entries in an eigenvector associated with a zero eigenvalue. All such eigenvectors can be collected in a DOF matrix. An optimal clustering is given by a low-dimensional orthogonal binary basis, i.e., the basis values are either zero or one. The basis best approximates the DOF matrix.

Finding such a basis is known to be NP-hard. Therefore, the problem is relaxed continuously by a spectral clustering of the row-vectors of the DOF matrix, or by an independent components analysis of its columns. The clustering seeks groupings whose motions are most decorrelated, and the analysis seeks full statistical independence, a stronger condition.

By identifying non-rigidities in the solution, this analysis provides a useful basis for deciding which nodes need additional constraints, e.g., in the form of additional directional constraints.

Problems Admitting "Negative Lengths"

Because $\epsilon(-X) = \epsilon(X)$, the projection of a node-to-node displacement onto the desired direction, $(x_j - x_i)^T > d_{ij}$, can be positive or negative. In general, perfectly constrained problems only admit solutions where projections are either all positive or all negative. But problems that are under constrained or problems that have inconsistent constraints can have MSE solutions with some projections of varied sign. An all-positive solution can be found via quadratic programming (QP). The QP problem uses an eigenvalue decomposition $H_\epsilon \to V \text{diag}(\lambda) V^T$. A nonzero vector m mixes the eigenvectors $y = Vm$ to incur minimal squared error $\epsilon \doteq m^T \text{diag}(\lambda) = \epsilon(X)$, while keeping all lengths positive. Scaling the resulting vector m to unit norm is equivalent to performing constrained optimization on a hypersphere. Because eigenvectors with large eigenvalues are unlikely to be used, it is useful to restrict the problem to consider only the smallest eigenvalue/vector pairs by truncating V and $\lambda$. This is a small QP problem.

Problems with Misaligned or Rotated Nodes

In an alignment problem, the $i^{th}$ node's constraints $\{d_{ij}\}j$ are perturbed by a rotation $R^T_i$, which needs to be identified and removed prior to embedding. Assuming that the directional constraints are consistent with the acquired signals, such perturbations are only detectable as sources of error in the embedding.

Figure 4:
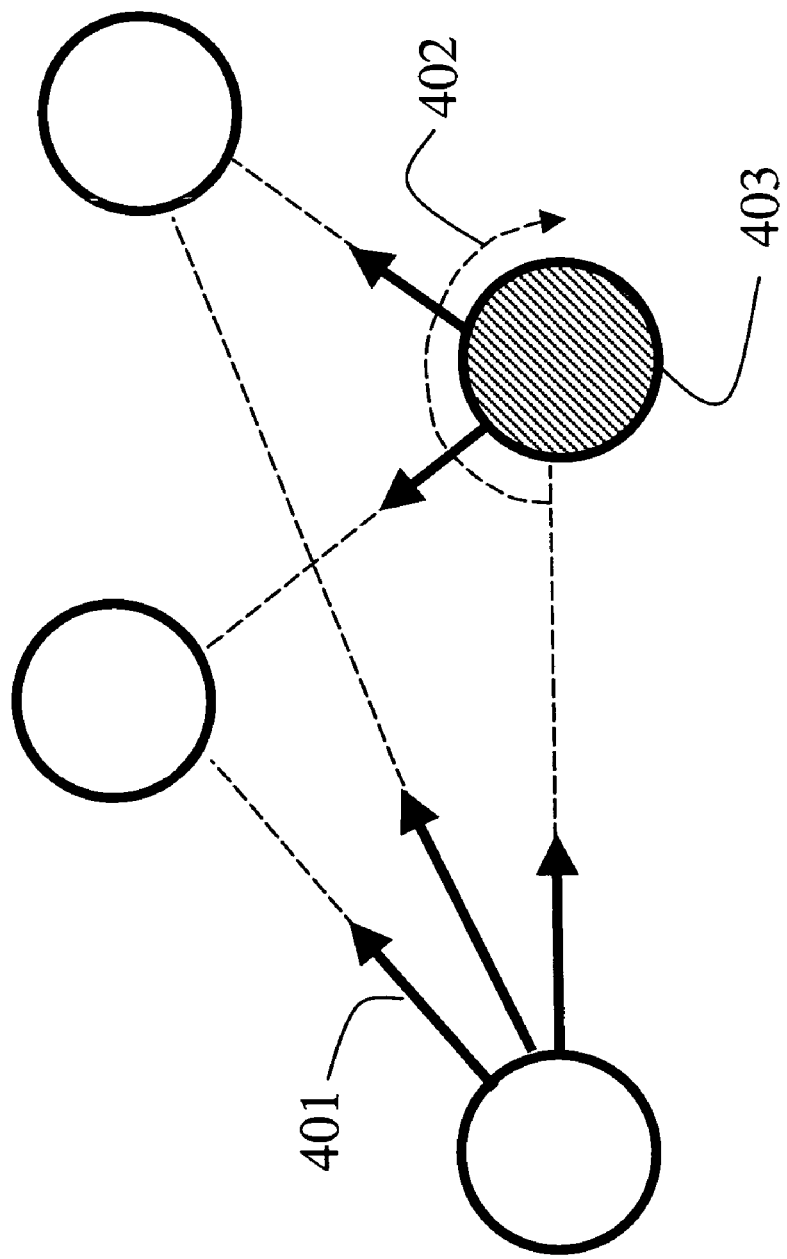
FIG. 4 is a diagram of a well-constrained embedding of sensors.

Unfortunately, as shown in FIG. 4, there are some well-posed embedding problems where rotations induce no errors. There, a set of directional constraints 401 (solid arrows) have a well-constrained embedding for every rotation 402 of shaded node 403.

Even when rotations do produce errors, the alignment problem is almost certainly not convex because the error function is quartic in the rotation parameters, ignoring orthonormality constraints. However, if the perturbations are small and error-producing, then it is reasonable to expect that the error function is approximately convex in the neighborhood of the optimal solution. In this case, the MSE embedding can be mildly distorted in this neighborhood. Thus, an alternating least-squares procedure that computes embeddings from rotated constraints and rotations from embeddings iterates to a set of constraints that admits a lower-error embedding. Strictly speaking, this is only guaranteed when one rotation is updated per iteration. For small perturbations, the error declines monotonically when all rotations are updated en masse.

Solution for the optimal rotation is a Procrustes alignment problem: Construct a matrix $A_i \doteq [\Rightarrow_j d_{ij}/\|d_{ij}\|]$ from the normalized directional constraints, and construct a matrix $B_i \doteq [\Rightarrow_j (x_j-x_i)/\|x_j-x_i\|]$ from the normalized embedding displacements. An optimal aligning rotation $R_i = \arg\min_{R \in \mathbb{R}^{d \times d}, R^T R = RR^T = I} \|RA_i - B_i\|_F$ is $R_i = VU^T$ from the singular value decomposition $U\mathrm{diag}(s)V^T = A_i B^T_i$. Normalization prevents potential errors due to incorrect displacement lengths.

Example Calibrations of Sensor Networks

To assess the usefulness of the method according to the invention, signals were acquired by hundreds of sensors widely distributed over a university campus. The signals, in the form of images were the same as those processed by Antone et al. in "Scalable extrinsic calibration of omnidirectional image networks," see above. The data sets derived from the images include 3D directional constraints obtained by triangulating pairs of cameras against commonly viewed features of buildings and by an analysis of vanishing points in the images. These triangulations alone do not give a complete or consistent calibration. In addition, rough location were estimated for the cameras using a global positioning system (GPS), accurate to about five meters. Other than the noisy GPS data, there is no ground truth for this data.

Figure 5:
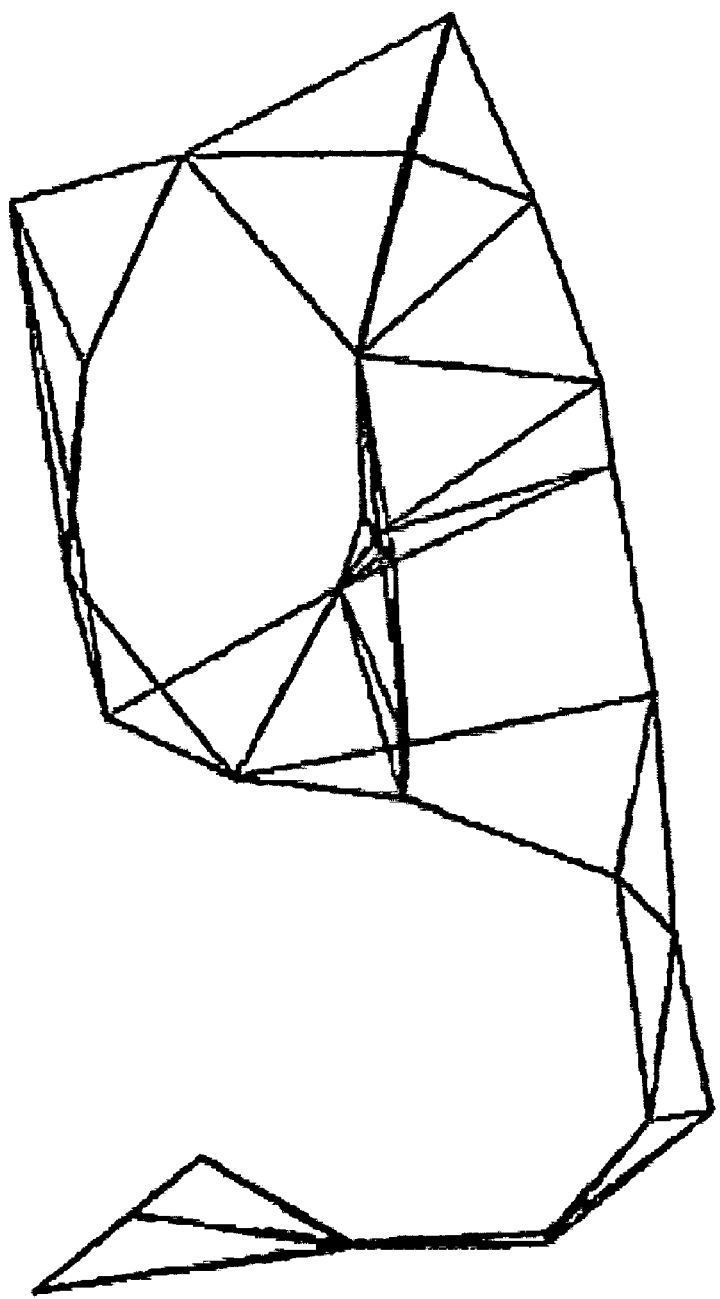
FIG. 5 is a first network of sensors analyzed by the invention.

FIG. 5 shows a "Green Building" node configuration 500, see FIG. 34 in Antone et al. This data set has 32 nodes spanning an area of roughly 80 by 115 meters. The prior art Antone method, implemented in a C program, recovers globally consistent locations with an average accuracy of about 45 millimeters. The maximum position error for any node is 81 mm. The method takes roughly one hour to execute.

The method according to the invention, implemented in 13 lines of Matlab code, which is known to be less efficient than C code, obtained a solution in about half a second, and reduces consistency errors by roughly four orders of magnitude, see Table A.

TABLE A

| Green dataset spectral embedding | mean | max | std |
| --- | --- | --- | --- |
| positional error (mm) | $3.541 \times 10^{-3}$ | $1.197 \times 10^{-2}$ | $2.390 \times 10^{-3}$ |
| orientation error (degrees) | $1.823 \times 10^{-5}$ | $1.639 \times 10^{-4}$ | $2.182 \times 10^{-5}$ |

Figure 6:
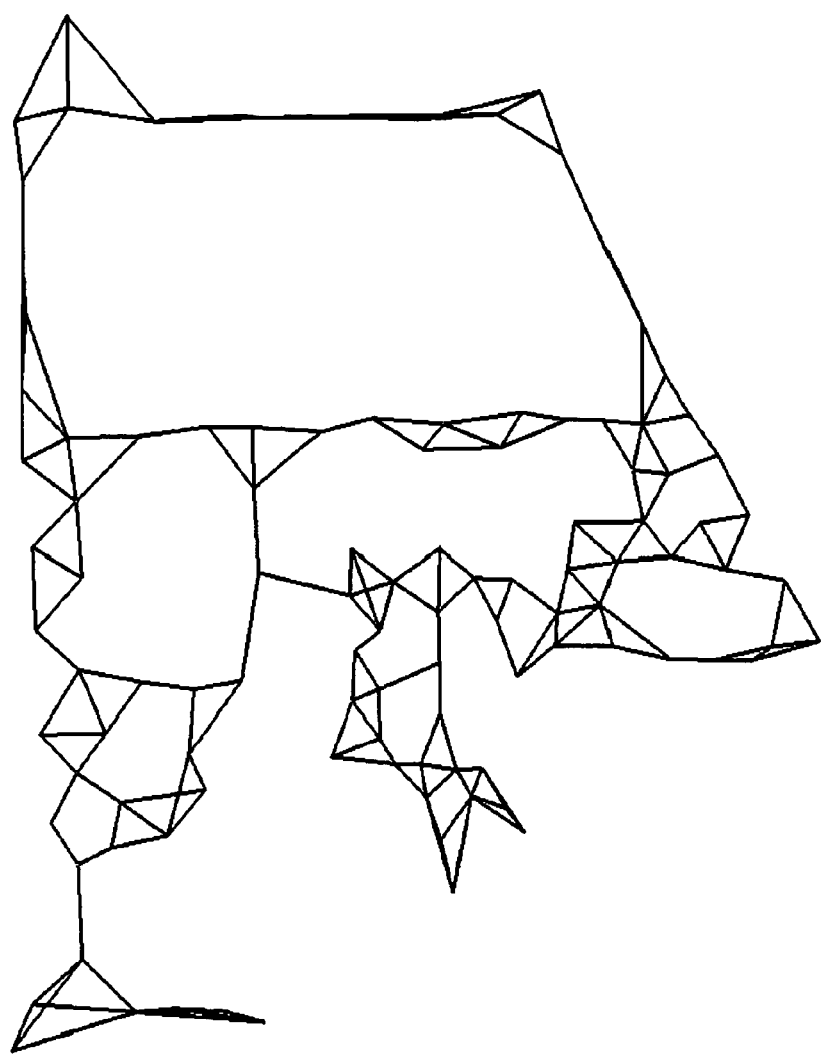
FIG. 6 is a second network of sensors analyzed by the invention.

FIG. 6 shows the "Ames Court" camera network 600 of Antone's FIG. 38. The Ames Court data set has 157 nodes spanning roughly 315 by 380 meters. Antone et al. solve a 100-node subset of this problem where all nodes are properly constrained. They recover global position, in roughly four hours, with an average consistency of 57 mm, and a maximum pose inconsistency of 88 mm.

The spectral embedding method according to the invention solve the problem for all 157 nodes in about three seconds. Again, the consistency errors are also reduced, even though there are many more nodes in our problem. In addition, there are several inconsistent constraints. For example, the present data set contains a node whose constraints are rotated 43° out of alignment with the rest of the data. More notably, the data set lacks some of the constraints that made the problem fully constrained for Antone et al. The problem is underconstrained in that several nodes lack more than one linearly independent constraint, and thus the nodes can slide freely along the directional vectors. It is also overconstrained in that many of the multiply constrained nodes have no error-free embedding, i.e., the constraints are inconsistent. Consequently, the first thirteen eigenvectors give $\epsilon=0$ embeddings in which the inconsistently constrained nodes are collapsed into point clusters, while the rest, mainly underconstrained nodes, are distributed through space. These "degenerate" solutions turn out to be degrees-of-freedom (DOFs) of the non-trivial solution, which is the first eigenvector with a non-zero error.

Eigenvector $v_{14}$ has an error $\epsilon=\lambda_{14}\approx 7.3\times 10^{-5}$. This eigenvector specifies an embedding that distribute and pose of all nodes through the environment in a reasonable reconstruction of the true scene. This embedding also reflects constraints that are inconsistent with the true geometry of the scene. Positive lengths can be enforced by quadratic programming.

Effect of the Invention

The partial spectral decomposition method according to the invention provides linear-time optimal solutions to graph embedding from directional constraints. These solutions have perfect fidelity to the constraints, and the solutions expose flaws in the constraints. Some flaws can be detected and corrected automatically, yielding near-perfect embeddings of ill-constrained problems, even when the constraints have substantial systemic errors.

One particularly advantageous property of the spectral method is that a solution can be updated in near-linear time when new data arrives, because new nodes and new constraints can be expressed as a series of low-rank modifications to an expanded nullspace $H\epsilon$ matrix. Therefore, new viewpoints and environmental features can be added incrementally.

It should be immediately clear that this method applies to any problem where one wants to compute the poses of a network nodes from incomplete directional constraints. These nodes can be non-imaging sensors, for example, phased array microphones or phased array antennas, which sense directional information from phase or time-of-flight differences in the acquired signals. The invention may also be useful in the setting of astronomy, where features in the night sky give a natural set or reference features for computing global orientation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for determining poses of a plurality of sensors distributed in an environment, comprising:
   acquiring a signal of the environment with each sensor;
   identifying features in each signal that correspond to the features in at least one other signal;
   determining directions between each sensor and the corresponding features to determine orientations of the sensors, and in which constraints in the directions are uncertain;
   assembling nulispaces of the directions in a matrix;
   determining a single nulispace eigenvector of the matrix; and
   configuring the single nulispace eigenvector to a matrix having one row for each dimension of each location of each sensors.

2. The method of claim 1, in which the sensors are cameras, the signals are images, and the directions are determined from features in the images.

3. The method of claim 1, in which the sensors are array radio receivers and the directions are determined from differences in phase of the signals radiating from point sources in the environment.

4. The method of claim 1, in which the sensors are array radio receivers and the directions are determined from differences in time of flight of the signals radiating from point sources in the environment.

5. The method of claim 1, in which the matrix includes a plurality of eigenvectors, and further comprising:
   selecting a linear combination of the plurality of eigenvectors to make all of the directions positive.

6. The method of claim 1, in which constraints on the directions are simultaneously inconsistent and overconstrained and underconstrained.

7. The method of claim 1, further comprising:
   projecting the matrix onto an orthogonal basis of a nullspace of a translation basis.

* * * * *